Dec. 10, 1940.   J. JENSEN   2,224,226
INDUSTRIAL CUTTING TOOL
Filed Dec. 21, 1936
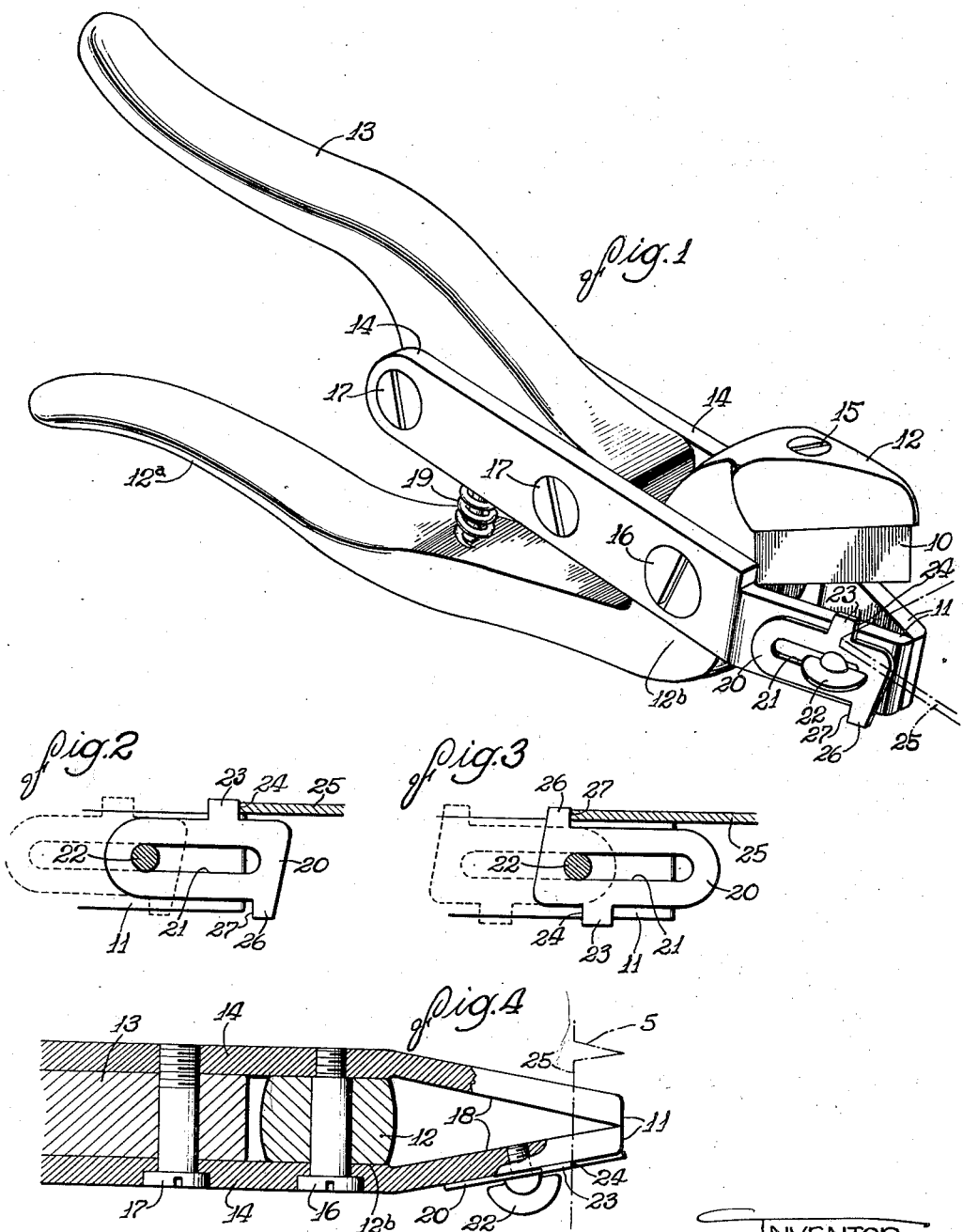
INVENTOR
John Jensen
By Parker, Carlson, Pitzner & Hubbard
ATTORNEYS Patented Dec. 10, 1940

2,224,226

UNITED STATES PATENT OFFICE 2,224,226

INDUSTRIAL CUTTING TOOL

John Jensen, Rockford, Ill., assignor to Whitney Metal Tool Company, Rockford, Ill., a corporation of Illinois Application December 21, 1936, Serial No. 116,910

4 Claims. (Cl. 30—229)

The invention relates to industrial cutting tools and more particularly to the type of tool used in sheet metal work for enabling a cut or series of cuts to be made along the edge of a piece of sheet metal or the like.

An object of the invention is to provide a new and improved tool of this type embodying a novel gauging device of simple and inexpensive construction whereby to regulate the depth of cut or series of cuts to be taken, said regulation extending over a large range with a relatively small gauging device.

More specifically stated, it is an object of the invention to provide an adjustable gauging device for attachment in a suitable position on the cutting tool comprising a longitudinally shiftable and rotatable or reversible supporting means with a plurality of engageable abutments so positioned on the sides thereof as to allow a regulation of the depth of cut varying from a maximum, when an abutment is brought into active position in the plane of material to be cut, to a minimum when said supporting means is shifted to bring another abutment into operative position, said supporting means being adjustable longitudinally to attain intermediate adjustments.

A further object of the invention is to provide a cutting tool in the manufacture of which the number of machine operations is reduced and in the use of which a convenient and efficient operating structure is afforded embodying cross levers pivoted intermediate their ends to provide coacting jaws, upon one of which is mounted a shearing or entering member of a die, adapted to engage a complementary or receiving die member formed at the ends of two metal plates pivoted on either side of the cross lever carrying the shearing die, said metal plates being rigidly secured to a handle to prevent relative motion therebetween.

Other objects and advantages will become apparent from the following description taken in connection with the accompanying drawing, in which:

Figure 1 is a perspective view of a notching tool embodying the features of the invention.

Figs. 2 and 3 are diagrammatic views of a gauging device with the regulation for a minimum depth of cut shown in full outline and that for a maximum depth in dotted outline.

Fig. 4 is a fragmentary sectional view of the notching tool.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The cutting tool shown in the drawing for purposes of disclosure is of the type used for enabling a V-shaped notch 5 or series of such notches to be formed along the edge of a piece of sheet metal or the like and the intervening portions bent back to form a flange as is frequently desirable in sheet metal working. However, it is to be understood that the tool is not to be limited to the notching type but may be constructed for enabling cuts of any desired configuration to be made. Conventionally tools of this type used in working sheet metal comprise cross members pivoted at their junction to provide coacting jaws, similar to the ordinary pair of shears of pliers, upon which complementary dies are mounted.

Referring to Fig. 1, the present invention is embodied in a device having a cross lever 12 which includes an extended handle portion 12a and a flattened portion 12b to which a second cross member, hereinafter to be described, may be pivotally secured. Adjacent an end of the lever 12 a shearing or entering die element 10 of a wedge shape is mounted, preferably by a screw 15 or the like, so that the element may be removed for sharpening. The shearing element is designed to coact with the receiving die element 11 of a V-shape formed from the ends of two metal plates 14, said plates having spaced portions arranged to straddle the wedge-carrying lever 12 at its flattened section 12b and to be pivotally joined thereto by a screw pivot 16 secured in the plates. A handle 13 is rigidly secured with the ends of the plates beyond the pivotal point by spaced screws 17. This type of assembly is advantageous because of its simplicity, the few machine operations necessary, movement of the two plates relative to each other and to the handle is prevented, rigidity of the pivotal connection is assured, and ample space is available for the free exit of punchings between the plates. To further facilitate this latter operation, the plates may be beveled on their inner sides to provide relief in the receiving die element as indicated at 18, Fig. 4.

It is preferred that the tool be normally maintained in an open position and to this end the cross levers are spring loaded by a helical spring 19 interposed between the handles and held in position by a projection extending from one handle into the central axis of said spring and by a depression in the other handle in which the spring seats.

A salient feature of the invention resides in the provision of a gauging device which, when a cut or series of cuts of a predetermined depth are to be made along the edge of a piece of sheet metal, may be easily adjusted and, being of a novel construction allowing a large range of regulation with a relatively small gauging device, may be effective for gauging purposes without hampering the efficient operation of the cutting tool. In this instance, the device provides gauging abutments suitably mounted to extend into the plane of the material to be cut and to limit the extent to which a sheet to be notched may enter between the jaws of the cutting tool. The gauging abutments may be shifted longitudinally of the jaws and each one is adapted to cover a given range of regulation when it is brought into abutting position. In the present embodiment, one abutment is positioned to provide regulation over the range of the inner half of the jaws while a second abutment is available for gauging on the outer half of the jaws.

The gauge may be attached in any convenient operative position on the cutting tool and is shown, in the present instance, as attached to the outer edge of one of the plates 14 constituting the female die member. As illustrated, the gauging device comprises a supporting plate 20 longitudinally slotted as shown at 21 to receive a clamping bolt 22, whereby it may be releasably engaged with said receiving die member for longitudinal sliding movement and rotation thereon. Gauging lugs 23 and 26, with abutting surfaces 24 and 27 respectively, integral with said gauge plate extend from the edges thereof.

Referring to the diagrammatic views, Figs. 2 and 3, wherein the gauge is shown in a position for regulation of a minimum depth of cut in full outline and for a maximum depth of cut in dotted outline, it will be apparent that when one gauging lug is in active position in the plane of the material to be cut, the other may be brought into position by reversing the gauge plate or rotating it through 180°. In Fig. 2, the gauging abutment 23 is shown as extending across the plane of a sheet of material to be cut illustrated at 25, the solid outline showing its position at the extremity of forward adjustment to fix the minimum depth of cut. As the plate is shifted rearwardly to the position illustrated in dotted outline in Fig. 2, the abutment 23 covers the forward range of the jaws. The abutments 23 and 26 are so positioned on the plate that rotation thereof in its last mentioned position through 180° about an axis perpendicular to the plane of the slot (at its right end in Fig. 2 or at its left end in Fig. 3) will bring the abutment 26 to its position of minimum regulation in substantially the same location occupied by abutment 23 when in its maximum regulation.

In Fig. 3, the gauging abutment 26 is shown in active position for its minimum regulation in solid outline, and the plate is positioned at the extremity of its forward movement; the slotted portion 21 of the plate extends forwardly from the clamping bolt so that the plate may be moved rearwardly, covering the inner range of the jaws, to the position of maximum regulation, illustrated in dotted outline.

It will be obvious from the foregoing that a novel cutting tool has been provided embodying a gauging device which may be incorporated therein at a very slight cost, which may easily be stamped from a piece of sheet metal and which is of a novel and simple construction easily adapted to tools of the type described whereby cuts may be efficiently gauged without impairing the operation of the tool.

I claim as my invention:

1. A notching tool for enabling V-shaped notches to be cut along the edge of a piece of sheet metal comprising, in combination, two cross-levers pivoted intermediate their ends to provide coacting jaws, a wedge shaped shearing member of a die mounted on one of said jaws, a complementary V-shaped receiving die member formed from the ends of two metal plates pivoted on either side of the wedge-carrying cross-lever and rigidly secured to a handle, said handle and said plates constituting the second cross-lever, spring means for yieldably urging the cross-levers to a biased position, and an adjustable gauging device, whereby to regulate the depth of cut to be made, comprising a longitudinally shiftable and rotatable gauge plate longitudinally slotted to receive a clamping bolt whereby it may be releasably engaged with a side of the receiving die member, said gauge plate having an gauging abutment rigid therewith and extending from one edge thereof into an active blocking position in the plane of the material to be cut, and having a second gauging abutment extending from the opposite edge of said plate and positionable for gauging purposes by reversing the plate whereby to provide a relatively large range of regulation with a small gauge plate.

2. In a cutting tool of the character described, a gauging device comprising a gauge plate longitudinally slotted to receive a clamping bolt whereby it may be releasably engaged in a suitable position on the cutting tool for longitudinal sliding motion and rotation thereon, said gauge plate having a gauging abutment integral therewith and extending substantially from the center of one edge thereof into the plane of the tool occupied by a sheet of material during a cutting operation and a second gauging abutment extending substantially from an end of the opposite edge of said plate and shiftable into active position in said plane by revolving the plate through 180° whereby to provide a relatively large range of regulation of the depth of cut to be taken with a relatively small gauge plate.

3. In a cutting tool of the character described, a gauging device attached to one of the cutting elements and comprising a longitudinally shiftable and rotatable gauge plate disposed with its plane substantially perpendicular to the plane of the tool occupied by a sheet of material during a cutting operation, gauging abutments positioned on opposite sides of said plate to provide a regulation of the depth of cut varying from a maximum when one of said abutments is brought into active position in said plane to a minimum when said plate is reversed bringing the other abutment into active position, said plate being shiftable longitudinally to attain intermediate adjustments.

4. In a cutting tool of the character described, the combination of a generally U-shaped member fashioned at its base portion to provide a receiving die and having rearwardly extending arms of substantial length, a handle rigidly secured between said arms of said U-shaped member with its inner end terminating remote from said die so as to provide a space intermediate said arms and between the inner end of said handle and said receiving die, and a cooperating lever having a head portion of a width corresponding to the width of the inner end of said handle and having an entering die mounted thereon for coaction with said receiving die, said head portion extending through said space and being fulcrumed solely on said U-shaped member.

JOHN JENSEN.